United States Patent
Morgillo

(12) 
(10) Patent No.: US 7,051,619 B1
(45) Date of Patent: May 30, 2006

(54) VEHICLE AXLE ASSEMBLY WITH INTERNALLY-SPLINED INPUT SHAFT

(75) Inventor: Vincent J. Morgillo, Northwood, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 10/334,031

(22) Filed: Dec. 30, 2002

(51) Int. Cl.
*F16H 57/02* (2006.01)
*B60K 17/00* (2006.01)

(52) U.S. Cl. .................. 74/607; 180/344; 180/348; 180/383; 403/52

(58) Field of Classification Search .............. 74/606 R, 74/607, 640; 475/222, 230, 331; 180/344, 180/348, 383–385; 403/52
See application file for complete search history.

(56) References Cited

U.S. PATENT DOCUMENTS

| | | | | |
|---|---|---|---|---|
| 846,754 A | * | 3/1907 | McClintock | ................ 475/202 |
| 936,595 A | * | 10/1909 | Alperin | ...................... 180/240 |
| 1,106,149 A | | 8/1914 | Loomis | |
| 1,191,295 A | * | 7/1916 | Fromm | ....................... 180/233 |
| 1,229,971 A | * | 6/1917 | Kennedy | ................... 180/245 |
| 1,239,990 A | * | 9/1917 | Ware | ......................... 180/245 |
| 1,315,217 A | | 9/1919 | Eason et al. | |
| 1,352,590 A | * | 9/1920 | Elbertz | ...................... 475/222 |
| 1,444,293 A | | 2/1923 | White | |
| 2,693,719 A | * | 11/1954 | Johnson | ...................... 475/221 |
| 2,699,075 A | * | 1/1955 | Buckendale | ............. 180/24.09 |
| 2,787,915 A | * | 4/1957 | Holton | ........................ 74/424 |
| 2,971,398 A | * | 2/1961 | Sieving | .................... 74/606 R |
| 3,030,825 A | * | 4/1962 | Diederich et al. | .......... 475/222 |
| 3,069,928 A | | 12/1962 | Cote et al. | |
| 3,554,055 A | * | 1/1971 | Galaniuk | ..................... 475/222 |
| 3,887,037 A | * | 6/1975 | Haluda et al. | ............. 184/6.12 |
| 4,721,011 A | * | 1/1988 | Kubo et al. | ............... 74/665 T |
| 4,867,001 A | * | 9/1989 | Sasaki et al. | .................. 74/424 |
| 5,094,655 A | | 3/1992 | Sato | |
| 5,916,055 A | * | 6/1999 | Wormbaecher | ............. 475/222 |

* cited by examiner

*Primary Examiner*—Tisha Lewis
(74) *Attorney, Agent, or Firm*—MacMillan, Sobanski & Todd, LLC

(57) ABSTRACT

A motor vehicle axle assembly includes a hollow cylindrical, internally-splined input shaft that is adapted to be connected to an externally-splined shaft of an end fitting of a driveshaft assembly. By using the mass centerline or center of balance of the end fitting shaft as a common center of balance for a balanced driveshaft assembly and further as a locating centerline for the connection between the input shaft of the axle assembly and the shaft of the rear end fitting of the driveshaft assembly, eccentricities in the connection between the input shaft and the end fitting are minimized to reduce noise and vibration. This also provides an adequate seal between the input shaft and the carrier of the axle assembly to retain lubricant in the carrier.

4 Claims, 2 Drawing Sheets

VEHICLE AXLE ASSEMBLY WITH INTERNALLY-SPLINED INPUT SHAFT

BACKGROUND OF THE INVENTION

This invention relates to an axle assembly for motor vehicles and in particular to an improved structure for a motor vehicle axle assembly which includes an input shaft having a hollow, cylindrical internally-splined stem that is adapted to be connected to an externally-splined shaft of the rear end fitting a driveshaft assembly.

A conventional vehicle drive train assembly includes an engine/transmission assembly that generates rotational power and transmits the rotational power through a driveshaft assembly to an axle assembly. The driveshaft assembly has a front end that is connected to an externally-splined output shaft of the engine/transmission assembly and a rear end that is connected to an externally-splined input shaft of the axle assembly by respective couplings and end fittings. The input shaft of the axle assembly is connected to a drive pinion that meshes with a ring gear of a differential, which is contained within a carrier. The ring gear meshes with a pair of side gears that are connected to a pair of output shafts, typically a pair of axles connected to the wheels of the vehicle. The differential is designed to distribute torque from the input shaft of the axle assembly to the two output shafts, while permitting the two output shafts to rotate at different speeds under certain conditions. When the vehicle is operated in a straight line, the wheels of the vehicle turn at the same speed, and torque is distributed equally by the differential to the two wheels. When the vehicle negotiates a turn, the outside wheel rotates at a somewhat faster speed than the inside wheel. As a result, although torque is continually supplied to both wheels, a somewhat greater amount of torque is supplied to the inside wheel than to the outside wheel.

Although a conventional axle assembly is effective, it has been found that eccentricities in the connection between the rear end fitting of the driveshaft assembly and the input shaft of the axle assembly can cause undesirable noise and vibration. These eccentricities can also make it relatively difficult to create and maintain an adequate seal between the rear end fitting of the driveshaft assembly and the carrier of the axle assembly. It would, therefore, be desirable to provide an improved structure for an axle assembly that reduces undesirable noise and vibration and creates and maintains an adequate seal to promote lubricant retention in the carrier.

SUMMARY OF THE INVENTION

This invention relates to an improved structure for a motor vehicle axle assembly. The axle assembly includes a hollow cylindrical, internally-splined input shaft that is adapted to be connected to an externally-splined shaft of an end fitting of a driveshaft assembly. By using the mass centerline or center of balance of the end fitting shaft as a common center of balance for a balanced driveshaft assembly and further as a locator for the centerline for the connection between the input shaft of the axle assembly and the shaft of the rear end fitting of the driveshaft assembly, eccentricities in the connection between the input shaft and the end fitting are minimized to reduce noise and vibration. This also provides an adequate seal between the input shaft and the carrier of the axle assembly to retain lubricant in the carrier.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
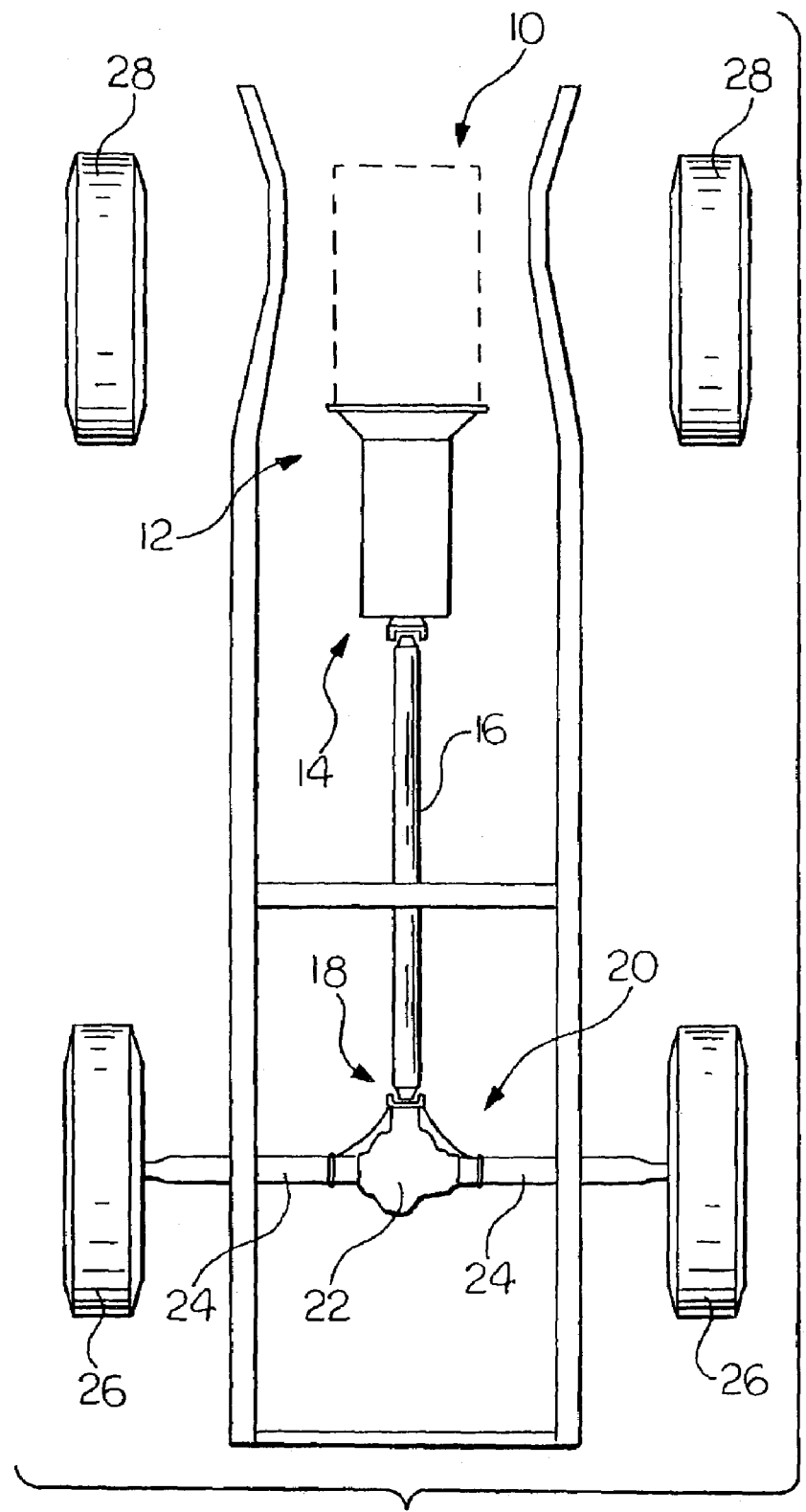
FIG. 1 is a schematic top plan view of a vehicle drive train assembly including an axle assembly in accordance with this invention.

Referring now to the drawings, there is schematically illustrated in FIG. 1 a portion of a vehicle containing a drive train assembly, indicated generally at 10, in accordance with this invention. The drive train assembly 10 includes a conventional engine/transmission assembly 12. The engine/transmission assembly 12 has an output shaft (not shown) that is connected to the front end of a driveshaft assembly 16, typically through an end yoke and universal joint, such as generally indicated at 14. The rear end of the driveshaft assembly 16 is connected, typically through another end yoke and universal joint, such as generally indicated at 18, to an axle assembly, indicated generally at 20. The axle assembly 20 is provided with a differential 22 for rotatably driving output shafts 24 which extend to respective rear wheels 26 of the vehicle. In the illustrated rear wheel drive embodiment of the vehicle, a pair of front wheels 28 is provided, but the front wheels are not rotatably driven. However, it should be appreciated that the differential 22 may be adapted to rotatably drive the front wheels 28 instead of the rear wheels 26. Alternatively, the differential 22 may be used as an inter-axle differential, commonly referred to as a transfer case (not shown), for rotatably driving the front and rear wheels of a four-wheel drive vehicle.

Figure 2:
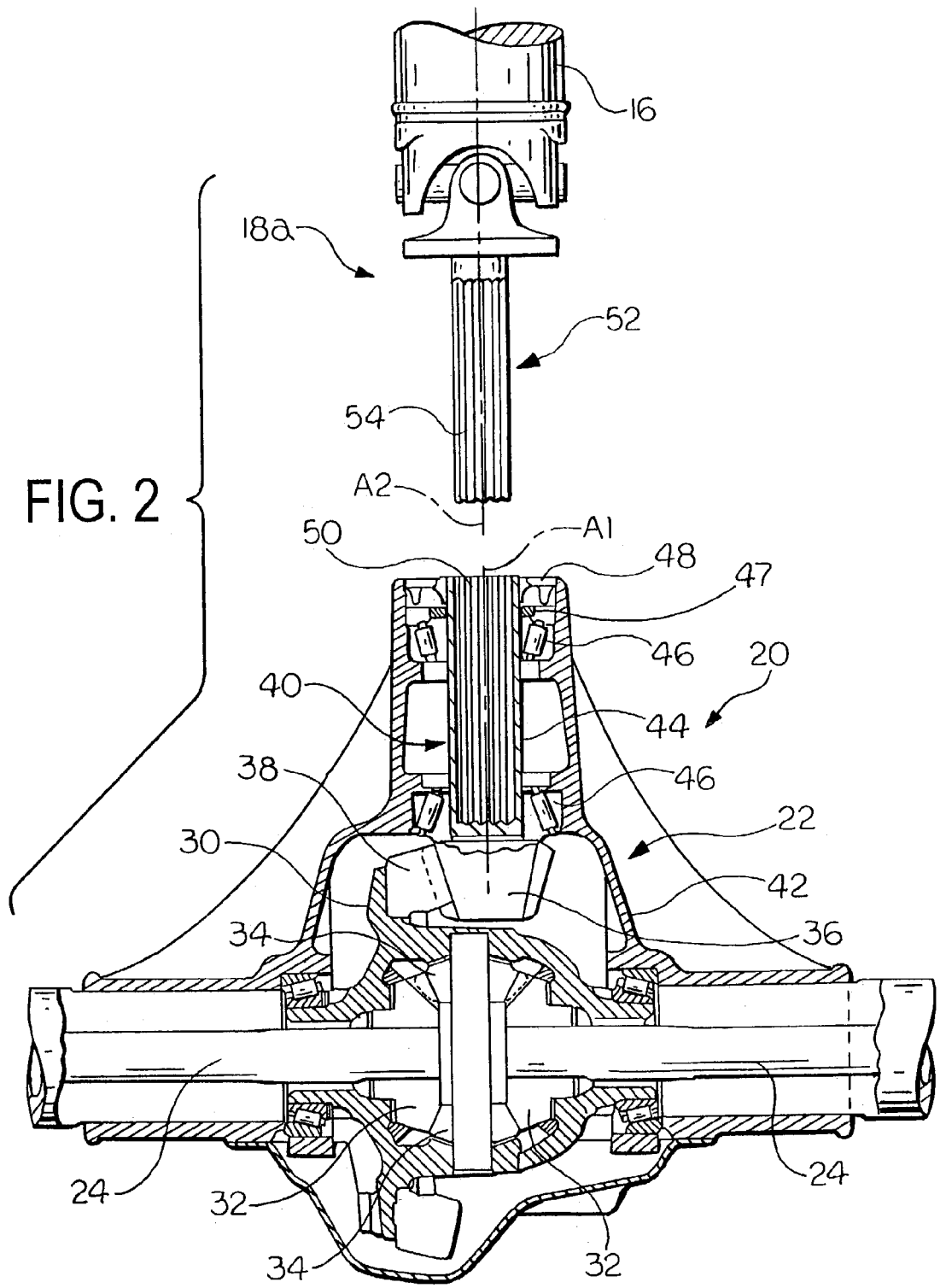
FIG. 2 is a top sectional plan view of the axle assembly illustrated in FIG. 1.

A portion of the axle assembly 20 is illustrated in detail in FIG. 2. As shown therein, the axle assembly 20 generally includes a differential housing 30 having side gears 32 rotationally mounted therein. The side gears 32 are rotationally fixed to the output shafts 24 of the axle assembly 20. Pinion gears 34 are provided between the side gears 32 to permit differentiation between the rotational speeds of the side gears 32 and, hence, the rear wheels 26 of the motor vehicle. A drive pinion 36 meshes with a ring gear 38 to rotate the differential housing 30, which, in turn, rotates the pinion gears 34 to drive the side gears 32 and thus drive the rear wheels 26. An input shaft 40 is connected to the drive pinion 36. The rear end of the driveshaft assembly 16 is connected to the axle assembly 20 through the input shaft 40. The differential housing 30, the side gears 32, the pinion gears 34, the drive pinion 36, the ring gear 38, and the input shaft 40 are rotatably supported within a carrier 42.

The input shaft 40 according to the present invention includes a hollow cylindrical sleeve 44. The hollow cylindrical sleeve 44 is provided at the front end of the input shaft 40 and the drive pinion 36 is connected to the rear end of the input shaft 40. The hollow cylindrical sleeve 44 is rotatably supported within the front end of the carrier 42. The hollow cylindrical sleeve 44 has an outside bearing diameter for supporting one or more bearings, such as the pair of bearings 46 shown. Although the bearings 46 shown are tapered bearings, any suitable bearings may be used for carrying out the instant invention. The hollow cylindrical sleeve 44 has an externally threaded surface in front of the bearings 46. A nut 47 is threaded onto the externally threaded surface for holding the bearings 46 on the hollow cylindrical sleeve 44. The front end of the hollow cylindrical sleeve 44 has a seal surface for supporting a seal 48. The seal 48 is press fit into the front end of the carrier 42 to provide a seal between the input shaft 40 and the carrier 42 for retention of lubricant (not shown) in the carrier 42.

The hollow cylindrical sleeve 44 further has an internal spline 50. The hollow cylindrical sleeve 44 rotates around an axis of rotation A1, which is the same as the axis of rotation of the drive pinion 36. Moreover, the dynamic center of balance of the hollow cylindrical sleeve 44 and the drive pinion 36 are coincident. Consequently, the hollow cylindrical sleeve 44 and the drive pinion 36 are intrinsically and dynamically balanced so that noise or vibration by the input shaft 40 is minimized and an adequate seal between the input shaft 40 and the carrier 42 is maintained for the retention of lubricant in the carrier 42. The bearings 46 and the seal 48 are located along the axis of rotation A1 of the hollow cylindrical sleeve 44 and the drive pinion 36 so the bearings 46 and the seal 48 do not cause noise or vibration. Moreover, the seal 48 circumferentially surrounds the hollow cylindrical sleeve 44 to maintain the seal between the input shaft 40 and the carrier 42. Although the hollow cylindrical sleeve 44 is contained within the carrier 42, it may extend beyond the front of the carrier 42 without adversely affecting the operation of the present invention.

The hollow cylindrical sleeve 44 is dimensioned and configured to receive the shaft 52 of the end fitting 18a at the rear end of the driveshaft assembly 16. The interface between the hollow cylindrical sleeve 44 and the shaft 52 of the end fitting 18a can accommodate length changes in the drive train assembly 10 resulting from articulation of the motor vehicle suspension. An internal spline 50 within the hollow cylindrical sleeve 44 meshes with an external spline 54 in the shaft 52 of the end fitting 18a along the same pitch circle or other spline characteristic dimension. This locates the axis of rotation A2 of the end fitting shaft 18a along the axis of rotation A1 of the input shaft 40. In this way, the dynamic centerline of mass of the end fitting 18a is located coincident with the dynamic centerline of mass of the input shaft 40 and drive pinion 36. This promotes concentric movement of the input shaft 40, which further minimizes noise or vibration and maintains an adequate seal between the input shaft 40 and the carrier 42. During normal, steady state operation of the drive train assembly 10, the axis of rotation A2 of the end fitting 18a may frequently become coincident with the axis of the driveshaft assembly 16. This would establish the dynamic centerline of mass of the entire driveshaft assembly 16 coincident with the dynamic centerline of mass of the end fitting 18a. Hence, the input shaft 40 and the driveshaft assembly 16 would be located along the same dynamic centerline of mass. This would further promote concentric movement of the input shaft 40, thereby further minimizing noise or vibration and maintaining an improved seal between the input shaft 40 and the carrier 42.

As can be seen from FIG. 2, the internally-splined sleeve 44 is supported by the bearings 46, which are in turn supported by the structure of the carrier 42. The positioning of the female member, i.e., the sleeve 44, in the carrier 42 rather than positioning the male member, i.e., splined shaft 52, in the carrier 42, provides an important functional advantage to the overall operation of the axle assembly 20. If the end fitting 18a includes a sleeve, as is conventional, the axle assembly 20 must be designed to receive the sleeve during assembly of the drive train assembly 10, and then secure that sleeve for rotational movement within the carrier 52. In contrast to the conventional arrangement, in the arrangement of the invention the end fitting 18a has the splined shaft, and the sleeve is already positioned within the carrier 52. This allows the axle assembly 20 to be manufactured with more robust support for the input shaft 40, including the sleeve 44. The input shaft 40 can be integrally formed and assembled during manufacturing of the carrier 52. The two sets of bearings 46 can be secured and configured within the carrier 42 for the maximum stability of the rotatable sleeve 44 to minimize vibration of the sleeve 44 during operation. The two sets of bearings 46 can be spaced apart axially along axis A1 as far as a possible to enhance the stability of the sleeve 44.

In operation, the externally-splined shaft 52 of an end fitting 18a of a driveshaft assembly 16 is inserted into the hollow cylindrical, internally-splined sleeve 44 of the input shaft 40. The splined interface between the hollow cylindrical sleeve 44 and the shaft 52 of the end fitting 18a functions as a slip joint to accommodate changes in length of the drive train assembly 10 resulting from articulation of the motor vehicle suspension. By using the mass centerline or center of balance of the end fitting 18a as a locating centerline for the connection between the input shaft 40 of the axle assembly 20 and the shaft 52 of the rear end fitting 18a of the driveshaft assembly 16, eccentricities in the connection between the input shaft 40 and the end fitting 18a are minimized to reduce noise and vibration during the operation of the drive train assembly 10. In some situations the mass centerline or center of balance of the end fitting 18a will become a common center of balance for the driveshaft assembly 16 as well, thereby further reducing eccentricities in the connection between the input shaft 40 and the end fitting 18a to further minimize noise and vibration during the operation of the drive train assembly 10. Moreover, non-eccentric motion of the input shaft 40 helps prolong and maintain the seal between the input shaft 40 and the carrier 42 of the axle assembly 20 to retain lubricant in the carrier 42.

It should be appreciated by one of ordinary skill in the art that the present invention is not limited to use in the axle assembly 20, as described above, but may be used in the engine/transmission assembly 12 or a transfer case (not shown). In other words, the output shaft (not shown) of the engine/transmission assembly 12 may have an internally-splined sleeve, such as the sleeve 44 described above, that is adapted to connect to an externally-splined shaft of an end fitting 18a at the front end of the driveshaft assembly 16. Similarly, a transfer case may have an internally-splined sleeve that connects to an externally-splined shaft.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An axle assembly comprising:
   a carrier;
   a bearing supported on said carrier;
   a drive pinion rotatably supported on said bearing, said drive pinion including a hollow, internally-splined sleeve that is adapted to receive an externally-splined shaft of an end fitting of a driveshaft assembly to function as a slip joint between said hollow, internally-splined sleeve of said drive pinion and the externally-splined shaft of the end fitting to accommodate changes resulting from suspension articulation, said hollow, internally-splined sleeve including a threaded surface; and a nut threaded onto said threaded surface of said hollow, internally-splined sleeve for retaining said bearing on said sleeve.

2. The axle assembly defined in claim 1 wherein said hollow, internally-splined sleeve further includes a seal surface, and further including a seal that engages said seal surface of said hollow, internally-splined sleeve and a portion of said carrier to provide a seal therebetween.

3. A combined driveshaft and axle assembly comprising:

a driveshaft including a first end that is adapted to be rotatably driven and a second end including an end fitting having an externally-splined shaft; and an axle assembly including a carrier; a bearing supported on said carrier; a drive pinion rotatably supported on said bearing, said drive pinion including a hollow, internally-splined sleeve that receives said externally-splined shaft to function as a slip joint between said hollow, internally-splined sleeve of said drive pinion and said externally-splined shaft of said end fitting to accommodate changes resulting from suspension articulation, said hollow, internally-splined sleeve including a threaded surface; and a nut threaded onto said threaded surface of said hollow, internally-splined sleeve for retaining said bearing on said sleeve.

4. The combined driveshaft and axle assembly defined in claim 3 wherein said hollow, internally-splined sleeve further includes a seal surface, and further including a seal that engages said seal surface of said hollow, internally-splined sleeve and a portion of said carrier to provide a seal therebetween.

* * * * *